United States Patent
Dore et al.

(10) Patent No.: US 7,508,879 B2
(45) Date of Patent: Mar. 24, 2009

(54) UWB TELECOMMUNICATION SYSTEM AND COMMUNICATION DEVICE TO BE USED THEREIN

(75) Inventors: Jean-Baptiste Dore, Lanester (FR); Bernard Uguen, Rennes Cedex (FR); Stephane Paquelet, Rennes Cedex (FR); Louis-Marie Aubert, Rennes Cedex (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 623 days.

(21) Appl. No.: 11/182,901

(22) Filed: Jul. 18, 2005

(65) Prior Publication Data
US 2006/0025086 A1    Feb. 2, 2006

(30) Foreign Application Priority Data
Jul. 28, 2004    (EP) .................................. 04291928

(51) Int. Cl.
H04B 7/02    (2006.01)
(52) U.S. Cl. ..................... 375/267; 375/260; 375/295; 375/130; 375/316
(58) Field of Classification Search ................ 375/142, 375/343, 130, 260, 267, 295; 455/73, 41.2; 370/343
See application file for complete search history.

(56) References Cited

U.S. PATENT DOCUMENTS 5,239,685 A * 8/1993 Moe et al. ...................... 455/73
6,791,966 B1 * 9/2004 Mikkola et al. ............. 370/343
2004/0008729 A1 * 1/2004 Rogerson et al. ............ 370/478
2005/0031020 A1 * 2/2005 Paquelet et al. ............. 375/142
2005/0058211 A1 * 3/2005 Paquelet ..................... 375/259
2005/0232381 A1 * 10/2005 Paquelet et al. ............. 375/343
2005/0271118 A1 * 12/2005 Paquelet ..................... 375/130
2007/0015466 A1 * 1/2007 Paquelet et al. ............ 455/41.2

OTHER PUBLICATIONS

"IEEE 802.15.3a 480 Mbps Wireless Personal Area Networks Achieving a Low Complexity Multi-band Implementation", White Paper Discrete Time Communication, Jan. 2003, XP008039323, pp. 1-10.
Xingxin Gao et al. "Muti-band UWB System with Hadamard Coding", Vehicular Technology Conference, Oct. 6-9, 2003, vol. 2, XP010700853, pp. 1288-1292.
Ghavani, Kohno, Michael, "Generation of Ultra Wideband Waveforms", May 31, 2004, XP002312620, pp. 50-57.

* cited by examiner

Primary Examiner—Sudhanshu C Pathak
(74) Attorney, Agent, or Firm—Oblon, Spivak, McClelland, Maier & Neustadt, P.C.

(57) ABSTRACT

A system to transmit data in the form of at least one pulse sequence modulated by symbol encoding units. The symbol encoding units include a plurality of signal encoders (ENCi) connected to a plurality of antennas, pulse generating units (PGi) for delivering a basic pulse sequence (PSQi), first energy splitting units (ENSPi) for splitting basic pulse sequence into sub-sequences (Psqi-PsqiK), signal modulating units (SGM1-SGMK) for applying to the sub-sequence a tunable coefficient, and combination units (CMBMi) for combining the sub-sequences (Tsgi1-TsgiK) into a signal (Tsgi) to be transmitted by the antenna (ANTi) to which the encoder (ENCi) is connected. Each signal encoder (ENCi) is linked to a single antenna (ANTi).

10 Claims, 6 Drawing Sheets

UWB TELECOMMUNICATION SYSTEM AND COMMUNICATION DEVICE TO BE USED THEREIN

BACKGROUND OF THE INVENTION

The present invention relates to a telecommunication system including at least one transmitter and one receiver respectively intended to transmit and receive a signal formed by at least one pulse sequence modulated by symbol encoding means included in the transmitter.

Such telecommunication systems are currently studied with the aim of assessing the relevance of so-called Ultra-Wide Band transmission techniques (further referred to as UWB systems and techniques, respectively). In such a system, each transmitter may be identified by a signature formed by chip numbers identifying respective positions of the pulses within associated time windows, which signature is in itself quite sturdy and may thus be reliably and accurately communicated to all potential receivers.

The pulses used in UWB systems are very short, having for example a duration lower than 1 nanosecond, which offers to such systems bandwidths at least as large as 7.5 GigaHertz, entailing high flexibility and hence numerous possible applications for such systems.

A pulse sequence as described above may form a carrying signal on which information can be encoded by modulation of said carrying signal. The inventors have observed that, because of the shortness of the pulses involved, a precise synchronization with a given pulse sequence may be difficult to perform at the receiver end, so that the chosen modulation scheme should preferably involve as few time-related parameters as possible in order to be cost-efficient. The inventors thus have chosen a modulation scheme according to which the information carried by pulse sequences may be recovered at the receiver end without having to map precisely, with respect to time, the received pulse sequences, which purpose is achieved by multiplying each pulse sequence by a value representative of a symbol to be carried by said pulse sequence, so that the information carried by signals transmitted accordingly may essentially be represented by the power carried by these signals, which power is related to the amplitude of the pulses included within such a signal.

Another problem to be solved is linked to the large bandwidth of the carrying signal to be used according to the principles described above. Indeed, it is very difficult, if not utterly impossible in the known state of the art, to design electronic circuits and antennas having invariant physical properties over a 7.5 GigaHertz bandwidth, e.g. a constant gain which is necessary for ensuring a same quality of service for all users of the system regardless of the carrying frequency chosen for each user.

BRIEF SUMMARY OF THE INVENTION

The present invention enables to actually embody the principles mentioned above, by proposing realistic implementations of components allowing to encode, transmit, receive and decode pulse sequences in an UWB telecommunication system as described hereinbefore.

Indeed, according to a first aspect of the invention, the symbol encoding means described in the opening paragraph include a plurality of signal encoders connected to a plurality of antennas and comprising each:

pulse generating means for delivering a basic pulse sequence, energy splitting means for dispatching said basic pulse sequence into at least two sub-sequences to be transmitted within respective frequency sub-bands, signal modulating means for applying to each sub-sequence a tunable coefficient representative of a symbol to be carried by said sub-sequence, and combination means for combining all sub-sequences delivered by the signal modulating means into a signal to be transmitted by the antenna to which the encoder is connected.

Thanks to the invention, each signal encoder is linked to a single antenna optimized for a fraction of the total bandwidth available to the system. Each antenna, as well as each component included in the related signal encoder will thus have a limited frequential range of operation, which in turn eases the design of said antenna or component and enables to ensure that said antenna or component will have essentially constant physical properties within its own frequential range of operation.

The energy splitting performed according to the invention enables to produce, on the basis of a single pulse sequence, a group of at least two symbols to be transmitted simultaneously through one of the plural communication channels supported by the plurality of transmitting antennas, and thus enables a telecommunication system according to the invention to provide a significantly increased throughput with respect to that of UWB systems known in the art. This particular embodiment is also remarkable in that each signal encoder, though including a single pulse generator, is able to generate multiple encoded pulse sequences.

The energy splitting means may be constituted by a Wilkinson splitter including at least two band-pass filters for creating at least two frequency sub-bands. Such a splitter is quite cheap to implement but has the drawback of dividing by the total number of sub-bands the energy dispatched into each outputted sub-band. The energy splitting means will thus preferably be build on the basis of a diplexer as will be explained hereinafter.

The pulse generating means will advantageously include a clock signal generator, a delaying gate for producing a delayed clock signal, and an output gate intended to combine the clock signal and the delayed clock signal for delivering a basic pulse sequence.

Such an embodiment is quite simple and cost-efficient, and enables to generate pulses having essentially a same shape and a same width, the latter corresponding roughly to the delay time necessary for the clock signal to pass through the delaying gate, which may be constituted by a simple inverter, in which case the output gate might be constituted by an XNOR gate.

The pulse generating means will preferably further include a binary oscillator intended to deliver alternate binary values for alternately selecting a non-inverting output or an inverting output of said output gate.

This embodiment of the pulse generating means enables to obtain an alternate distribution of positive and negative pulses, which will not affect the information carried by said pulses because said information is related to the square of said pulses according to the modulation scheme chosen by the inventors, but allows to prevent appearance of high-amplitude peaks in the spectral domain, which peaks could interfere with equipment not included in the telecommunication system. Such frequency interference should be limited as a rule, and is targeted by a European Commission Directive 83/336 CEE, as well as by regulation of the USA's Federal Communications Commission.

The modulation performed by the signal modulating means may be a simple On-Off Keying modulation, in which case the modulation means will essentially include an array of switches for allowing selected sub-sequences to reach the combination means.

The modulation performed by the signal modulating means may also be an amplitude modulation, in which case the modulation means will essentialy include an array of signal multipliers, each being intended to multiply a given sub-sequence by a tunable coding value. Each signal multiplier may then be built on the basis of a Gilbert cell, which is a simple and well-known analog circuit designed for mixing together two analog signals by means of three differential pairs of transistors. The tunable coding value may be greater than one, in which case the signal multiplier will act as an amplifier. The tunable coding value may also be smaller than one, in which case the signal multiplier will act as an attenuator or divider and may be constituted by a simple dividing bridge.

According to a variant of the invention described above, the transmitter further comprises symbol decoding means including a plurality of signal decoders connected to a plurality of antennas and comprising each:
  energy splitting means for dispatching an incoming signal received by the relevant antenna into at least two sub-signals to be demodulated within respective frequency sub-bands, and
  signal demodulating means for identifying within each sub-signal a tunable coefficient which could have been applied to each sub-sequence before transmission of the incoming signal and would then be representative of a symbol carried by said sub-sequence.

A transmitter as described above actually forms a transceiver, since being able not only to transmit modulated pulse sequences, but also to receive such pulse sequences by means of a plurality of antennas coupled each with a signal decoder optimized for a fraction of the total bandwidth available to the system. Each antenna, as well as each component included in the related signal decoder will thus have a limited frequential range of operation, which in turn eases the design of said antenna or component and enables to ensure that said antenna or component will have essentially constant physical properties within its own frequential range of operation.

As an additional advantage, a transceiver provided with a plurality of transmitting and receiving antennas as described above may also operate according to full-duplex communication schemes.

The signal encoders and the signal decoders may be coupled to two separate pluralities of transmitting and receiving antennas, respectively. A more cost-efficient embodiment enables alternative use of any given antenna for transmission or reception purposes.

According to this embodiment, each antenna included in said transceiver is connected, via switching means, to a signal encoder and to a signal decoder, the combination means included in said signal encoder and the energy splitting means included in said signal decoder being constituted by a same reversible frequency multiplexing module.

Such a frequency multiplexing module has an essentially symmetrical structure and may be used for combining or for splitting signals, depending on the direction followed for passing through said frequency multiplexing module. The embodiment described above thus not only allows to use a same antenna for transmitting or receiving encoded pulse sequences, but also enables to use a same component for implementing the combination means of the signal encoder and the energy splitting means included in said signal decoder, and thus to reduce the overall cost of a transceiver including such symbol encoding and decoding means.

A frequency multiplexing module having a reversible structure may for example include a first diplexer connected to two other diplexers arranged in parallel.

At least one, and preferably each of said diplexers will advantageously include two 90°-hybrid quadripoles connected together via two identical filters, which is a simple and very cost-efficient structure.

Each 90°-hybrid quadripole will preferably be formed by a Lange coupler, which is also quite cheap and easy to integrate.

According to another of its aspects, the invention also relates to a device able to transmit a signal formed by at least one pulse sequence, which device comprises symbol encoding means intended to multiply each pulse sequence by a value representative of a symbol to be carried by said pulse sequence, which symbol encoding means include a plurality of signal encoders connected to a plurality of antennas and comprising each:
  pulse generating means for delivering a basic pulse sequence,
  energy splitting means for dispatching said basic pulse sequence into at least two sub-sequences to be transmitted within respective frequency sub-bands into which a total bandwidth available for transmission is divided,
  signal modulating means for applying to each sub-sequence a tunable coefficient representative of a symbol to be carried by said sub-sequence, and
  combination means for combining all sub-sequences delivered by the signal modulating means into a signal to be transmitted by the antenna to which the encoder is connected.

The same principle consisting in dividing the total bandwidth may also be used separately at the receiver end of an UWB wireless link. According to yet another of its aspects, the invention thus also relates to a device able to receive a signal formed by at least one pulse sequence, which device comprises symbol decoding means including a plurality of signal decoders connected to a plurality of antennas and comprising each:
  energy splitting means for dispatching an incoming signal received by the relevant antenna into at least two sub-signals to be demodulated within respective frequency sub-bands into which a total bandwidth available for transmission is divided, each sub-signal potentially including a pulse sequence, and
  signal demodulating means for identifying within each sub-signal a tunable coefficient which could have been applied to the relevant pulse sequence before transmission of the incoming signal and would then be representative of a symbol carried by said sub-sequence.

BRIEF DESCRIPTION OF THE DRAWINGS

The characteristics of the invention mentioned above, as well as others, will emerge more clearly from a reading of the following description given in relation to the accompanying figures, amongst which.

DETAILED DESCRIPTION OF THE INVENTION

Figure 1:
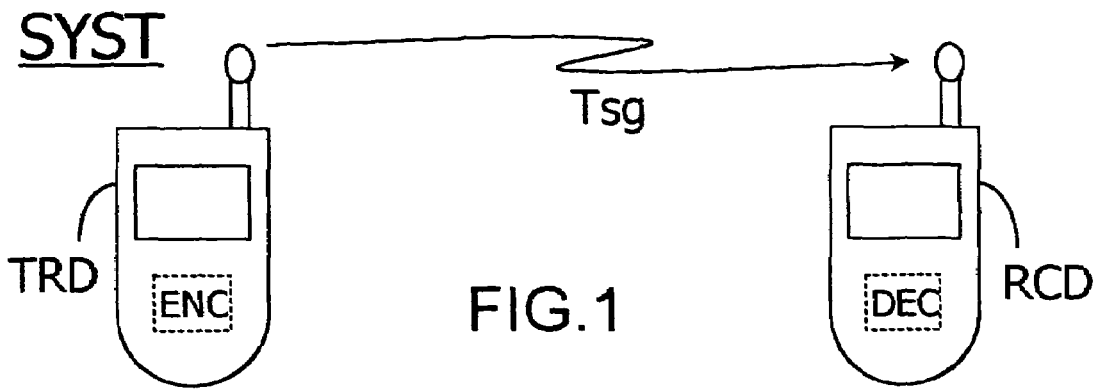
FIG. 1 is a block diagram depicting a telecommunication system in which the invention is used.

FIG. 1 depicts a telecommunication system SYST in which the present invention is embodied. This system SYST includes at least one transmitter TRD and one receiver RCD, which may for example be both constituted by devices such as mobile phones. The transmitter TRD is intended to transmit a signal Tsg formed by at least one sequence of Ns pulses pj (for j=1 to Ns) over Ns time windows Tf, each pulse being enclosed within a time chip Tc whose position within its relevant time window is defined by a chip number cj (for j=1 to Ns). The number Ns of pulses included in this sequence may, for example, be chosen equal to 128, while the width of each time window Tf may be chosen equal to 100 nanoseconds, with a width of 1 nanosecond for each time chip Tc.

According to the present invention, the transmitter TRD includes symbol encoding means ENC intended to multiply each pulse sequence by a coding value representative of a symbol to be carried by said pulse sequence, and the receiver RCD includes symbol decoding means DEC intended to identify and recover said coding value from the contents of the transmitted signal Tsg.

The information carried by the transmitted signal Tsg will essentially be represented by the power carried by this signal Tsg, which power is related either to the amplitude of the pulses included within said signal Tsg if an amplitude modulation scheme is chosen, or simply to the number of pulses actually transmitted if an On/Off Keying modulation scheme is chosen. This information may then be recovered by the receiver RCD without said receiver RCD having to map precisely, with respect to time, the received pulse sequences.

Figure 2:
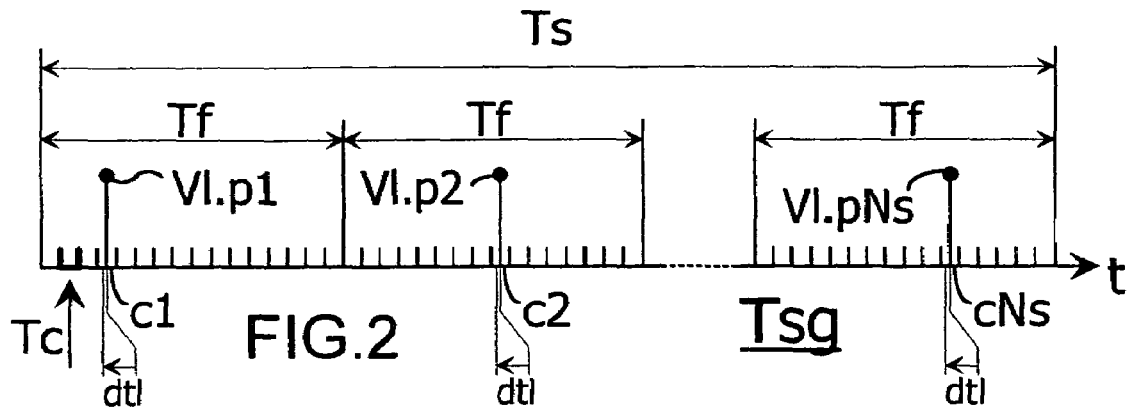
FIG. 2 is a chronogram depicting a pulse sequence constituting a carrying signal transmitted in such a telecommunication system.

FIG. 2 depicts such a transmitted signal Tsg in the form of a chronogram, according to which each pulse sequence has a total duration duration Ts divided into time windows having each a duration Tf, each time window being sub-divided into time chips Tc, a single time chip within each window being intended to enclose a pulse pj (for j=1 to Ns), which single time chip is identified by means of a chip number cj. The transmitter of this transmitted signal Tsg will thus be identified by a signature Sg=(c1, c2 ... cNs) jointly formed by all above-mentioned chip numbers cj (for j=1 to Ns), which signature Sg is in itself quite sturdy and may thus be reliably and accurately communicated to all potential receivers.

In accordance with the invention, each pulse pj (for j=1 to Ns) belonging to the pulse sequence shown in this picture has been multiplied by a same tunable coding value V1 representative of a symbol to be carried by said pulse sequence, in the form of the power carried by this sequence, the reference "1" being indicative of a reference number allocated to the pulse sequence under consideration.

Furthermore, the pulses pj (for j=1 to Ns) are multiplied by values αj which are alternately chosen equal to +1 or −1 for a given sequence. In the example shown here, the pulses pj (for j=1 to Ns) are positive.

Such an alternate distribution of positive and negative pulses, which does not affect the information carried by said pulses because said information is related to the squares of said pulses, allows to prevent appearance of high-amplitude peaks in the spectral domain.

All pulses pj (for j=1 to Ns) of the pulse sequence shown here may additionnally be submitted to a time jitter dtl in the course of the symbol encoding step.

The time-jitter dtl introduced by the time-delaying means will be kept small with respect to a delay spread which will be induced by a communication channel through which the modulated signal will be transmitted. The delay spread may have, for example, a value of 30 to 100 nanoseconds, so that the chosen time-jitter dtl will preferably be lower than 5 nanoseconds. Such a time-jitter won't affect the information carried by each pulse sequence, and mainly adds an additional degree of flexibility to the modulation scheme according to the invention. Indeed, the time-jitter dtl may for all purposes be considered unknown at the receiver end.

The transmitted signal Tsg may thus be expressed in the following form:

$$Tsg(t) = \sum_{l,j} Vl.\alpha j.pj(t - cj - j.Tf - dtl)$$

In an alternative embodiment of the invention not shown here, the transmitted signal Tsg will preferably be constituted by a superimposition of a predetermined number of sub-sequences, each of which being modulated as explained hereinbefore.

In such an embodiment, each sub-sequence of rank k (with k=1 to K where K is the total number of sub-bands) will be expressed as:

$$Tsgk(t) = \sum_{l,j} Vkl.\alpha kj.pkj(t - ckj - j.Tf - dtkl),$$

with $$Tsg(t) = \sum_{k} Tsgk(t)$$

This embodiment of the invention enables to transmit simultaneously several symbols through a same communication channel, and thus to significantly increase the throughput of such the system. This embodiment also enables to prevent narrow-band interference by allowing extraction of a sub-band polluted by a particular narrow-band transmission.

Moreover, a plurality of antennas may be used simultaneously for transmitting a plurality of signals Tsg as described above over a respective plurality of predetermined sub-bands into which a total bandwidth available for transmission has previously been divided, each signal Tsg having been delivered by a signal encoder connected to the related transmitting antenna.

Figure 3:
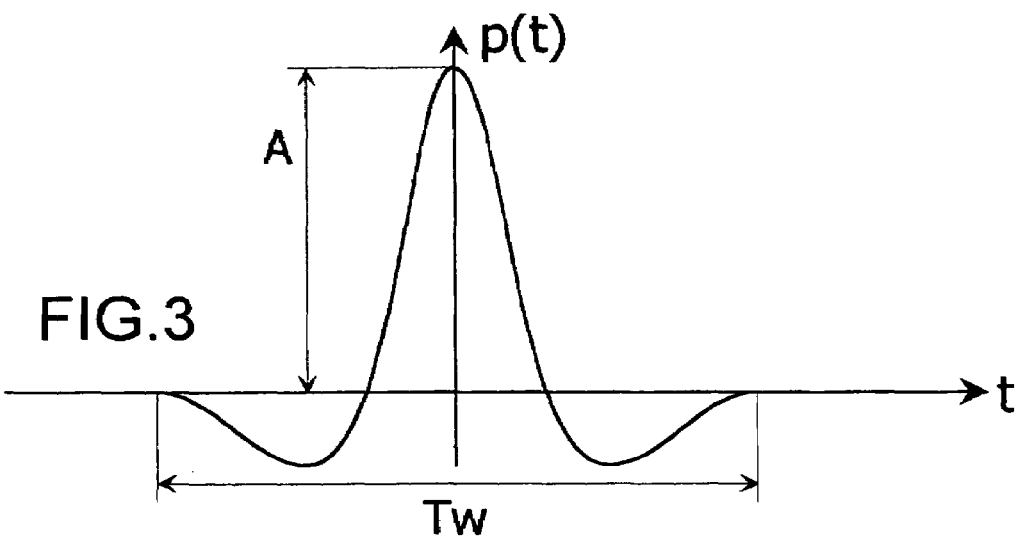
FIG. 3 is a chronogram depicting a pulse model which may be used for generating such a sequence.

FIG. 3 is another chronogram which depicts a possible shape p(t) which may be chosen for constituting the above-mentioned pulses. Though pulses pj(t) (for j=1 to Ns) of a same sequence may have different shapes, provided that they all have essentially a same width and carry a same quantity of energy, all pulses pj(t) (for j=1 to Ns) should preferably have a same shape since it will be more cost-efficient to use a same pulse generator for producing them. The shape p(t) depicted in this example is defined as a derivative of the second order of a Gaussian function, which may be expressed mathematically as $p(t)=A\cdot[1-4\pi(t/Tw)^2]\cdot\exp(-2\pi(t/Tw)^2)$. Other pulse shapes known to those skilled in the art may, of course, be used in this same purpose. A pulse generator intended to produce pulses having another shape will be described hereinafter.

Figure 4:
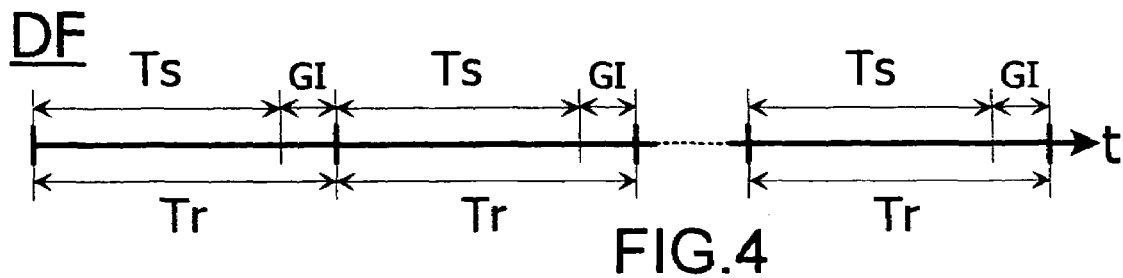
FIG. 4 is a chronogram depicting a data frame including a pluralty of pulse sequences.

FIG. 4 is yet another chronogram which depicts a dataframe DF formed by successive pulse sequences such as the one described above, each having a total duration Ts, a guard interval GI being periodically inserted between two such sequences in order to prevent alteration of a given sequence by a following one, which alterations coud be caused, for example, by intermodulation products between said pulse sequences. This dataframe DF is thus constituted by successive frames having each a duration Tr, whith Tr=Ts+GI, and including each a pulse sequence as described above.

In particular applications, the signature of any given transmitter may be dynamically generated within said transmitter and may thus vary from one pulse sequence to another. Such a signature may for example be generated by means of a specific control of a pre-programmed shiftable register. In such applications, any given receiver must be able to regenerate each signature corresponding to each pulse sequence, which may be achieved by providing said receiver with a shiftable register to be pre-programmed and controlled according to instructions sent beforehand to said receiver by a control infrastructure of the telecommunication system, e.g. in the form of Medium Access Control signals.

A device intended to receive such a data frame DF must thus only be able to measure quantities representative of the successive amounts of power carried by the successive pulse sequences, in order to identify the informational content of the dataframe DF, without having to map precisely, with respect to time, the received pulse sequences.

Figure 5:
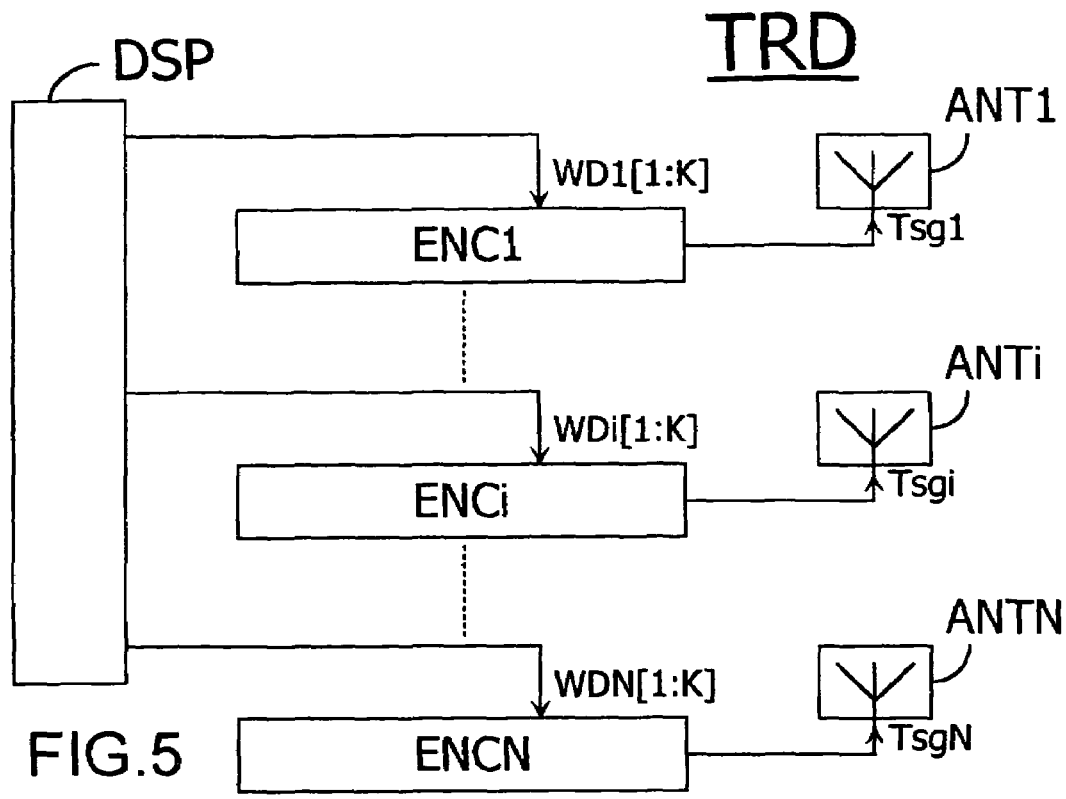
FIG. 5 is a block diagram depicting symbol encoding means included in a transmitter according to one aspect of the invention.

FIG. 5 diagrammatically shows a transmitting device TRD according to the invention, which includes a plurality of signal encoders ENCi (for i=1 to N) connected to a plurality of antennas ANTi (for i=1 to N). As explained hereinbefore, each signal encoder ENCi is intended to receive from a digital signal processor DSP a coding word WDi[1:K] constituted by K coefficients to be applied to K sub-sequences of pulses which will be combined into a single signal Tsgi (for i=1 to N) to be transmitted by antenna ANTi.

Each antenna ANTi (for i=1 to N), as well as each component included in the related signal encoder ENCi will thus have a limited frequential range of operation, which in turn eases the design of said antenna or component and enables to ensure that said antenna or component will have essentially constant physical properties within its own frequential range of operation. The total available bandwidth of the system may be comprised between 3.1 and 10.6 GHz, in which case the use of six separate signal encoders ENCi (for i=1 to 6) connected to six antennas ANTi (for i=1 to 6) will enable to restrict the spectral operating range of each signal encoder and antenna to a 1.25 GHz band, which may be coped with by using off-the-shelf components and antennas.

Figure 6:
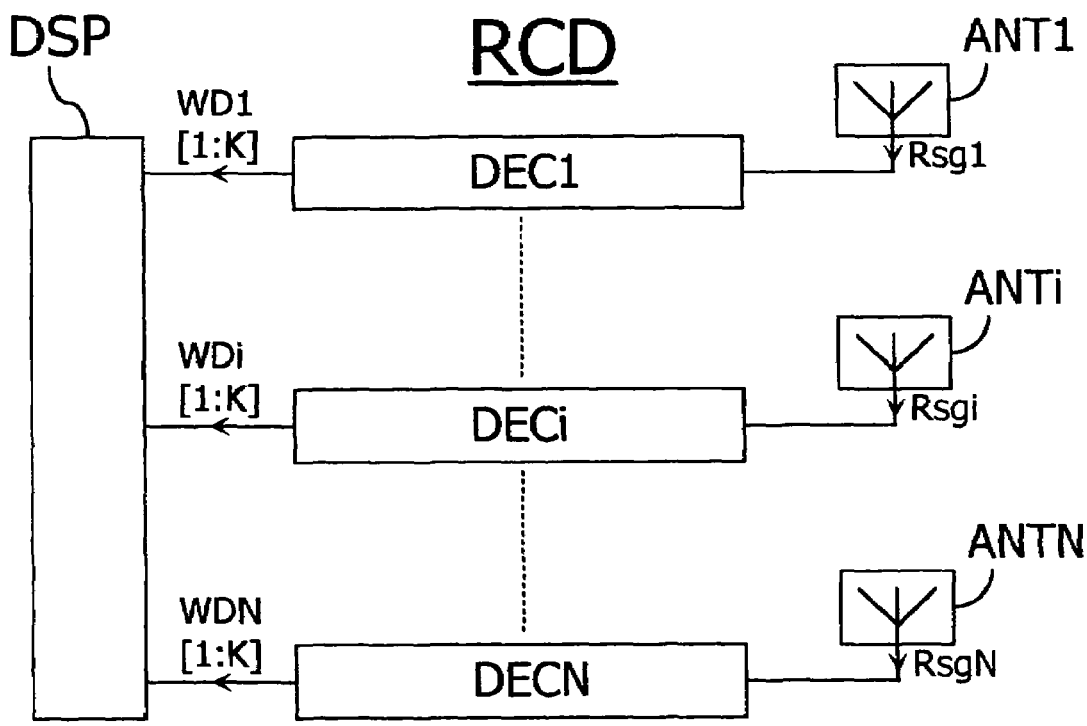
FIG. 6 is a block diagram depicting symbol decoding means included in a receiver according to another aspect of the invention

FIG. 6 diagrammatically shows a receiving device RCD according to another aspect of the invention, which includes a plurality of signal decoders DECi (for i=1 to N) connected to a plurality of antennas ANTi (for i=1 to N). As explained hereinbefore, each antenna ANTi is intended to deliver to each signal encoder DECi an (for i=1 to N), each of which included K combined sub-sequences of pulses, each signal encoder DECi being in turn intended to deliver to a digital signal processor DSP coding words WDi[1:K] constituted by K coefficients originally applied to said K sub-sequences and extracted from said incoming signal Rsgi.

Figure 7:
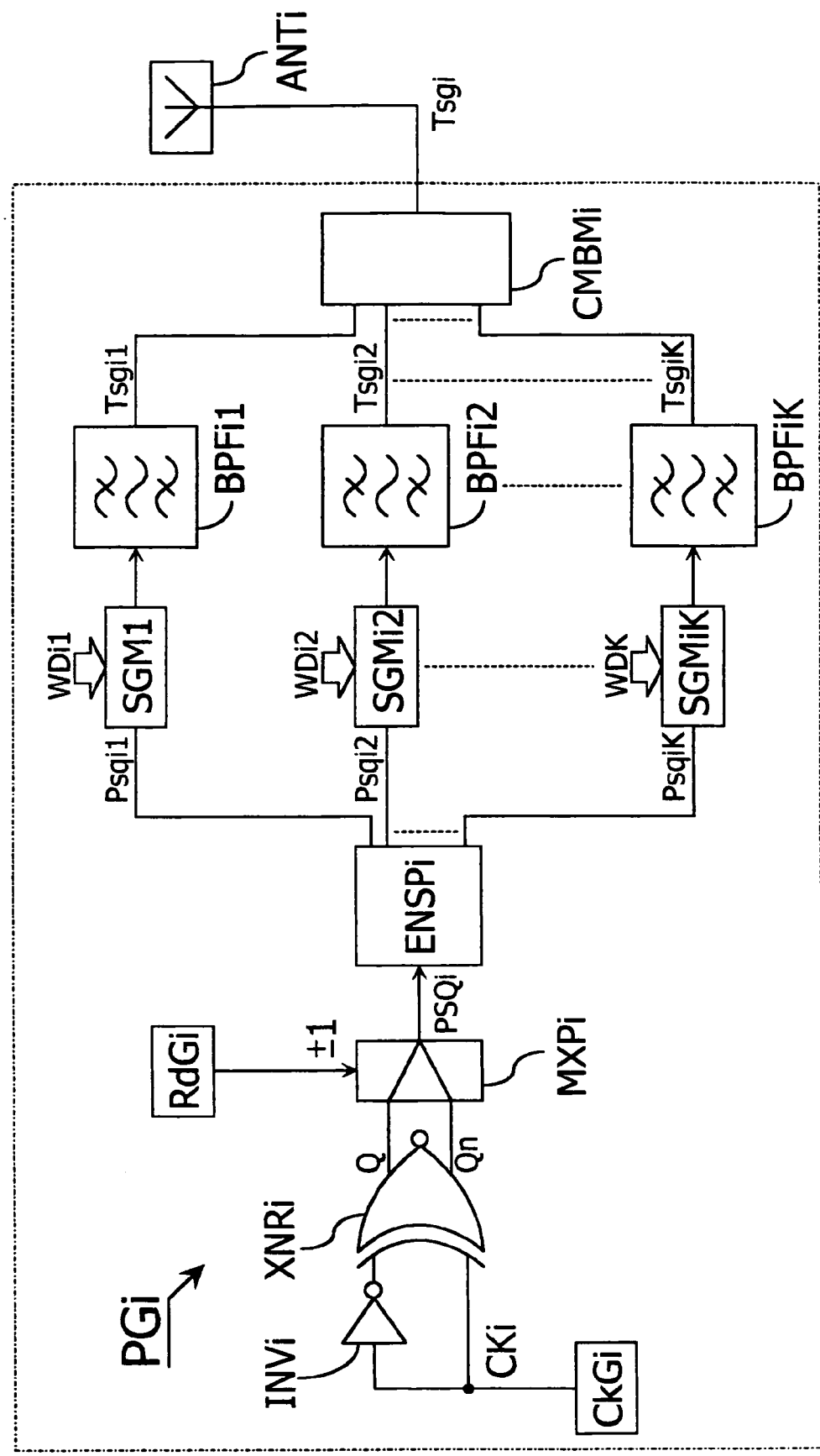
FIG. 7 is a block diagram depicting a signal encoder included in symbol encoding means according to one aspect of the invention.

FIG. 7 diagrammatically shows a signal encoder ENCi included in symbol encoding means according to a variant of the invention. This signal encoder ENCi includes:

pulse generating means PGi for producing a basic pulse sequence PSQi, an energy splitter ENSPi for dispatching said basic pulse sequence PSQi into at least K sub-sequences Psqik (for k=1 to K) to be transmitted within respective frequency sub-bands, signal modulating means SGMik (for k=1 to K) for applying to each sub-sequence Psqik a tunable coefficient WDik (for k=1 to K) representative of a symbol to be carried by said sub-sequence Psqik, and combination means CMBMi for combining all sub-sequences Tsgik (for k=1 to K) delivered by the signal modulating means SGMik into a signal Tsgi to be transmitted by the antenna ANTi to which the encoder ENCi is connected.

In the embodiment of the invention depicted here, the pulse generating means include a clock signal generator CkGi, a delaying gate INVi for producing a delayed clock signal, and an output gate XNRi intended to combine the clock signal CKi and the delayed clock signal for delivering a basic pulse sequence PSQi.

Such an embodiment is quite simple and cost-efficient, and enables to generate pulses having essentially a same shape and a same width, the latter corresponding roughly to the delay time necessary for the clock signal signal to pass through the delaying gate INVi, which is constituted in this example by a simple inverter, the output gate XNRi being constituted by an XNOR gate.

The pulse generating means further include a binary oscillator RdGi intended to deliver alternate binary values +1 or −1 for driving a multiplexer MXPi intended to alternately select the signals delivered by a non-inverting output Q or by an inverting output Qn of said output gate XNRi for constituting the basic pulse sequence PSQi.

This embodiment of the pulse generating means enables to obtain an alternate distribution of positive and negative pulses, which will not affect the information carried by said pulses because said information is related to the square of said pulses according to the modulation scheme chosen by the inventors, but allows to prevent appearance of high-amplitude peaks in the spectral domain.

The modulation performed by the signal modulating means SGMik (for k=1 to K) may be a simple On-Off Keying modulation, in which case the modulation means SGMik will essentially include an array of switches, e.g. MOS switches whose gates will be controlled by bits of a control word formed by the signal WDik (for k=1 to K), for allowing selected sub-sequences Psqik to reach the combination means CMBMi.

The modulation performed by the signal modulating means SGMik (for k=1 to K) may also be an amplitude modulation, in which case said modulation means SGMik will essentialy include an array of signal multipliers, each being intended to multiply a given sub-sequence Psqik (for k=1 to K) by a tunable coding value given by the value of an analog coefficient WDik. Each signal multiplier may then be built on the basis of a Gilbert cell, which is a simple and well-known analog circuit designed for mixing together two analog signals by means of three differential pairs of transistors, or may be constituted by a simple dividing bridge as explained hereinbefore.

In this particular embodiment of the invention, the signal encoder ENCi further includes K band-pass filters BPFk (for k=1 to K), each of which being intended to make sure that each modulated sub-sequence Tsgik (for k=1 to K) outputted by the signal modulating means SGMik is restricted to its specific sub-band, which ensures that no parasitic signal due to harmonics or any kind of rejection will disturb other sub-sequences carried within other sub-bands once all sub-sequences are recombined by the combination means CMBMi.

This particular embodiment of the invention enables to transmit simultaneously K symbols, by means of K encoded sub-sequences Tsgik (for k=1 to K), through a same communication channel supported by a single antenna ANTi dedicated to this signal encoder ENCi. This particular embodiment is also remarkable in that the signal encoder ENCi, though including a single pulse generator PLSG, is able to generate multiple encoded pulse sequences Tsgik.

Figure 8:
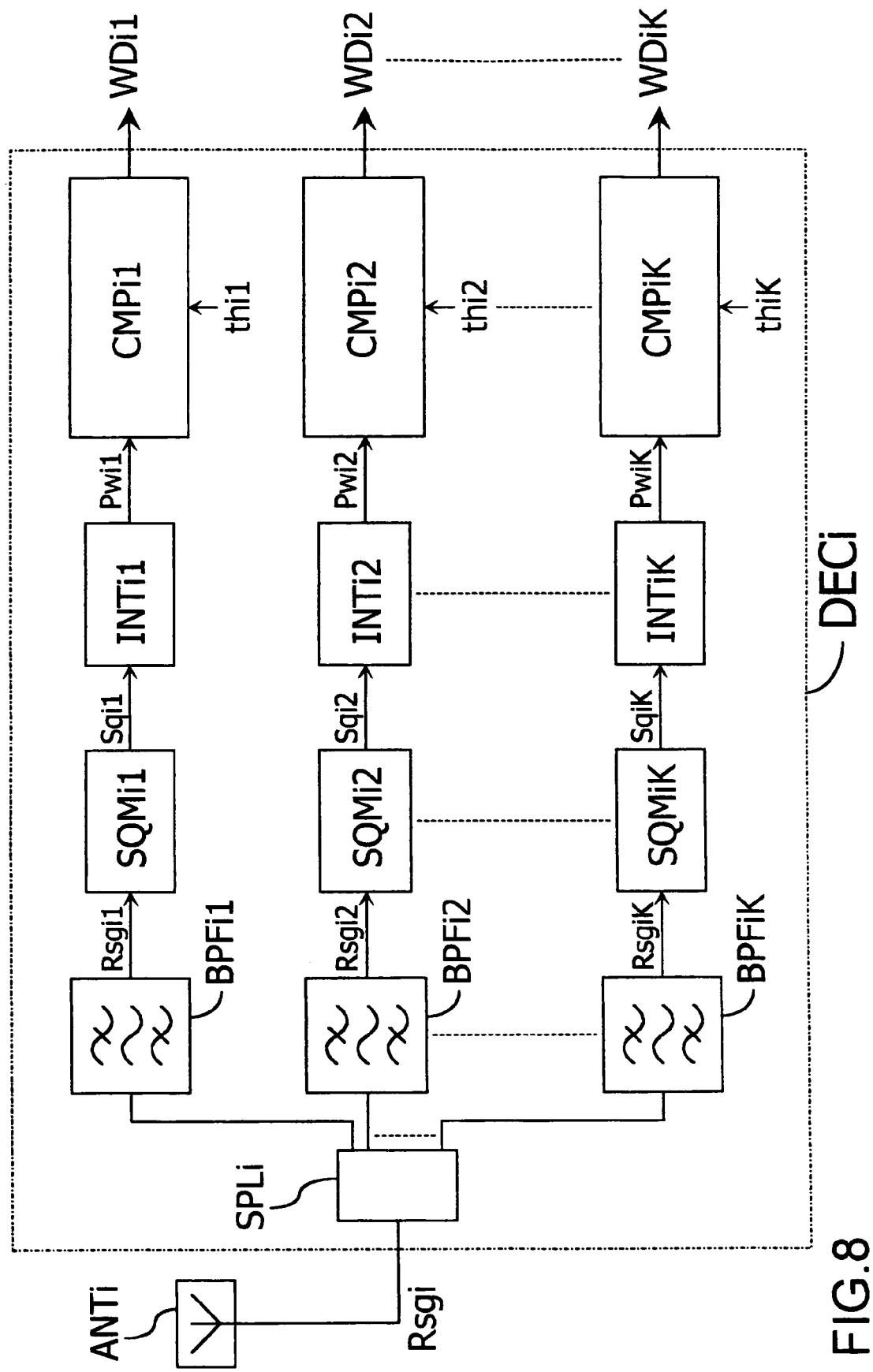
FIG. 8 is a block diagram depicting a signal decoder included in symbol decoding means according to another aspect of the invention.

FIG. 8 diagrammatically shows a signal decoder DECi included in symbol decoding means according to another variant of the invention. This signal encoder DECi includes:
  energy splitting means SPLi for dispatching an incoming signal Rsgi received by the relevant antenna into K sub-signals Rsgik (for k=1 to K) to be demodulated within respective frequency sub-bands, each sub-signal Rsgik potentially including a pulse sequence, and
  signal demodulating means for identifying within each sub-signal Rsgik (for k=1 to K) a tunable coefficient WDik which could have been applied to the relevant pulse sequence before transmission of the incoming signal and would then be representative of a symbol carried by said sub-sequence.

In this embodiment of the invention, in which the information carried by a received signal Rsgik is related to the amplitude of the pulses included within such a signal and thus represented by the power carried by said signal, the signal demodulating means include an array of K squaring modules SQMik (with k=1 to K), each of which being connected to a band-pass filter BPFik and intended to receive a sub-signal Rsgik (with k=1 to K) and to deliver a signal Sqik constituted by a square of said sub-signal Rsgik.

The signal demodulating means further include an array of K integrating modules INTik (with k=1 to K), each of which being connected to one of the squaring modules SQMik and intended to deliver a modulation value Pwik representative of an amount of power carried by the corresponding sub-signal Rsgik. Such a modulation value Pwik may for example be computed as the integral, on the duration of the channel delay, of the square signal Sqik delivered by the related squaring module SQMik.

The signal demodulating means also include an array of K comparing modules CMPik (with k=1 to K), each of which being connected to one of the integrating modules INTik and intended to compare the modulation value Pwik to be delivered by said integrating module INTk with at least one predetermined threshold values thik (with k=1 to K).

A tunable coefficient WDik (for k=1 to K) representative of a symbol carried by a given sub-signal Rsgik will thus be identified in a very straightforward manner, according to a simple decoding grid which may be expressed as follows:
  If Pwik<thik, then the tunable coefficient WDik carried by pulse sequence Tsk has a first value S0;
  If thik<Pwik, then the tunable coefficient WDik carried by pulse sequence Tsk has a second value S1.

Each squaring module SQMik (for k=1 to K) may be formed by a Gilbert cell fed with identical input signals, or by a diode operating in its own square law region. Each integrating module INTik (for k=1 to K) may be formed by an operational amplifier provided with an RC feedback. Each comparing module CMPik (for k=1 to K) may be formed by an operational amplifier intended each to receive a modulation value Pwik and a predermined threshold value thik assigned to this comparing module CMPik.

Figure 9:
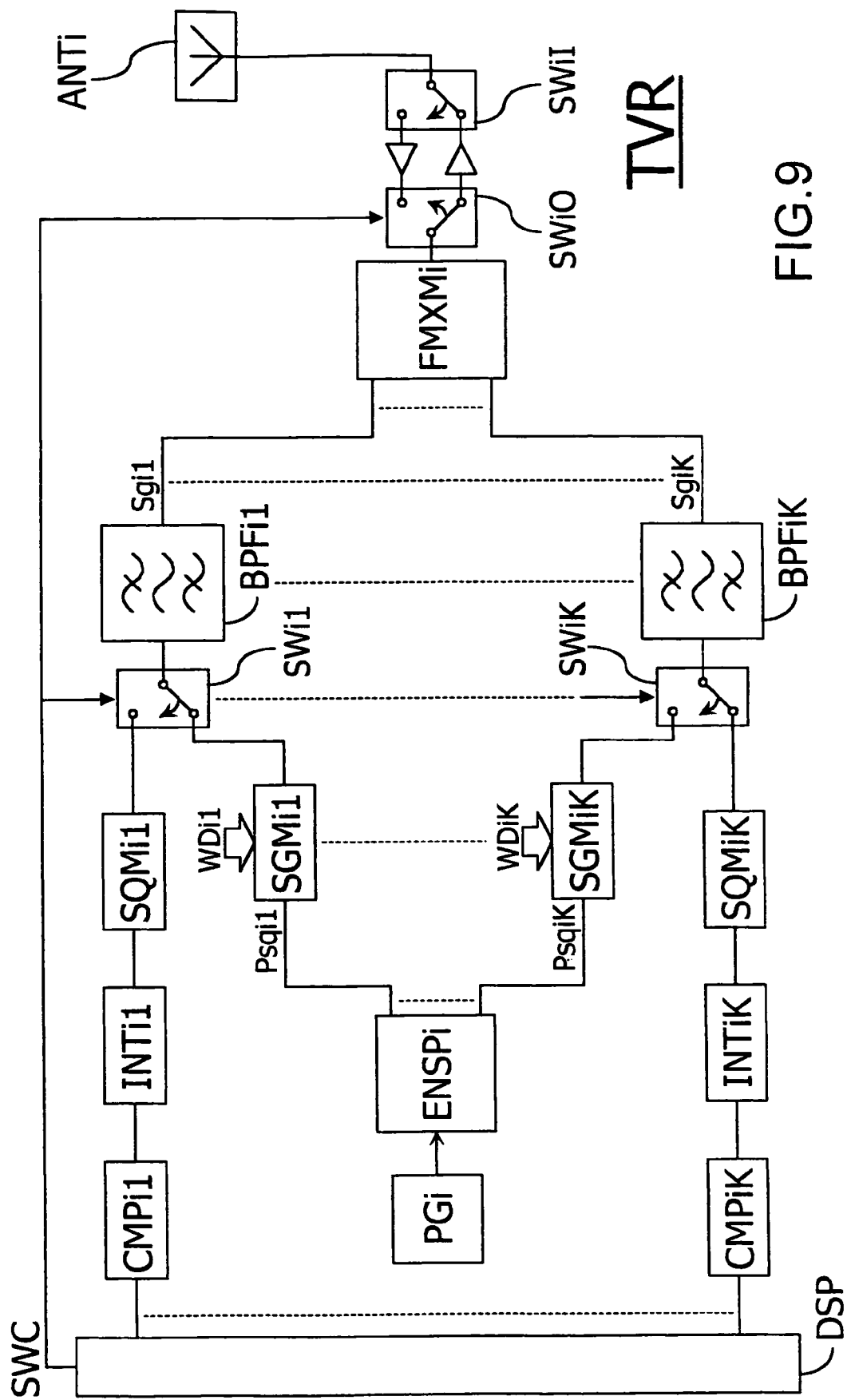
FIG. 9 is a block diagram depicting a preferred interleaved embodiment of a signal encoder and a signal decoder.

FIG. 9 diagrammatically depicts an interleaved design for a signal encoder and a signal decoder included in a same transceiver TVR according to a preferred embodiment of the invention. Indeed, though the signal encoders and the signal decoders may be coupled to two separate pluralities of transmitting and receiving antennas, respectively, a more cost-efficient embodiment enables alternative use of any given antenna for transmission or reception purposes.

According to this embodiment, each antenna ANTi included in said transceiver TVR may be alternatively connected, via switching means (SWIO, SWiI, SWi1 . . . SWiK) controlled by a control signal SWC issued by the digital signal processor DSP, to a signal encoder or to a signal decoder as described above. In this embodiment of the invention, the combination means included in said signal encoder and the energy splitting means included in said signal decoder are constituted by a same reversible frequency multiplexing module FMXMi, the array of band-pass filters BPFik (for k=1 to K) being in this example also common to the signal encoder and to the signal decoder.

The frequency multiplexing module FMXMi has an essentially symmetrical structure and may be used for combining or for splitting signals, depending on the direction followed by signals Sgi (for k=1 to K) passing through said frequency multiplexing module. The embodiment of the invention described above thus not only allows to use a same antenna for transmitting or receiving encoded pulse sequences Sgi (for k=1 to K), but also enables to use a same component for implementing the combination means of the signal encoder and the energy splitting means included in said signal decoder, and thus to reduce the overall cost of a transceiver TVR including such symbol encoding and decoding means.

Figure 10:
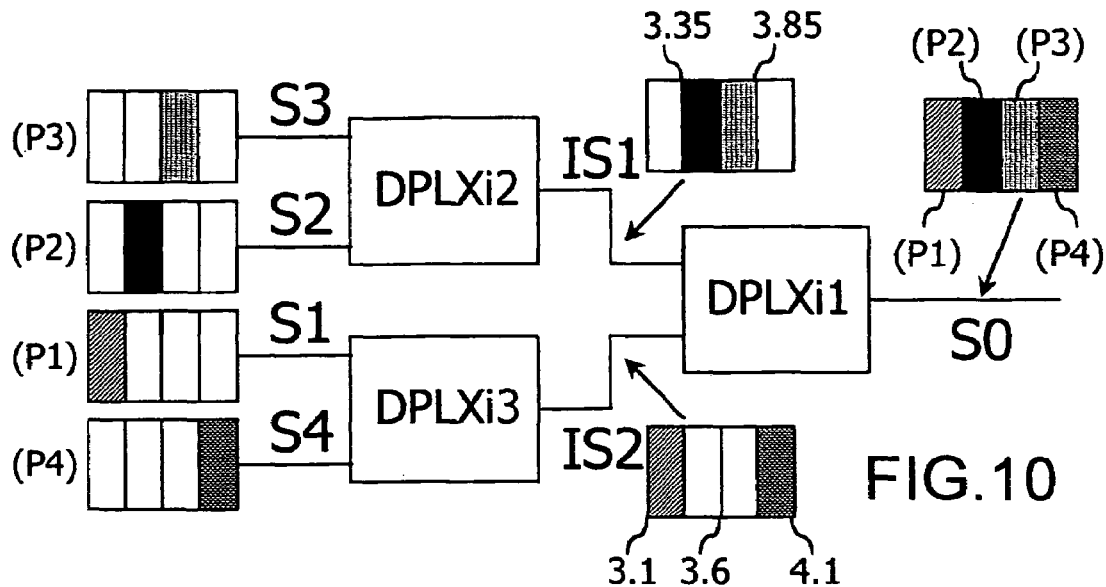
FIG. 10 is a block diagram depicting a frequency multiplexing module included in such an interleaved embodiment.

FIG. 10 diagrammatically shows a frequency multiplexing module FMXMi having a reversible structure, constituted by a quadriplexer including in this example a first diplexer DPLXi1 connected to two other diplexers DPLXi2 and DPLXi3 arranged in parallel. As shown here, the total bandwidth [3.1 GHz -4.1 GHz] of a single signal S0 of such a frequency multiplexing module FMXMi may be divided into four sub-bands of 0.25 GHz each allocated to sub-signals S1, S2, S3 and S4 having, when separated, same respective energies P1, P2, P3 and P4 than when combined within the single signal S0. Each diplexer, e.g. DPLXi1, is intended to deliver or to receive two intermediate and complementary signals, e.g. IS1 and IS2, respectively carrying the central bandwidths and the extreme bandwidths.

In other embodiments of the invention, the frequency multiplexing module FMXMi may consist in a triplexer constituted by a diplexer having a single terminal on one side and a pair of terminals on another side, only one of the terminals of said pair being connected to another diplexer. The possible associations of the diplexers, triplexers and quadriplexers described hereinbefore are limitless.

Figure 11:
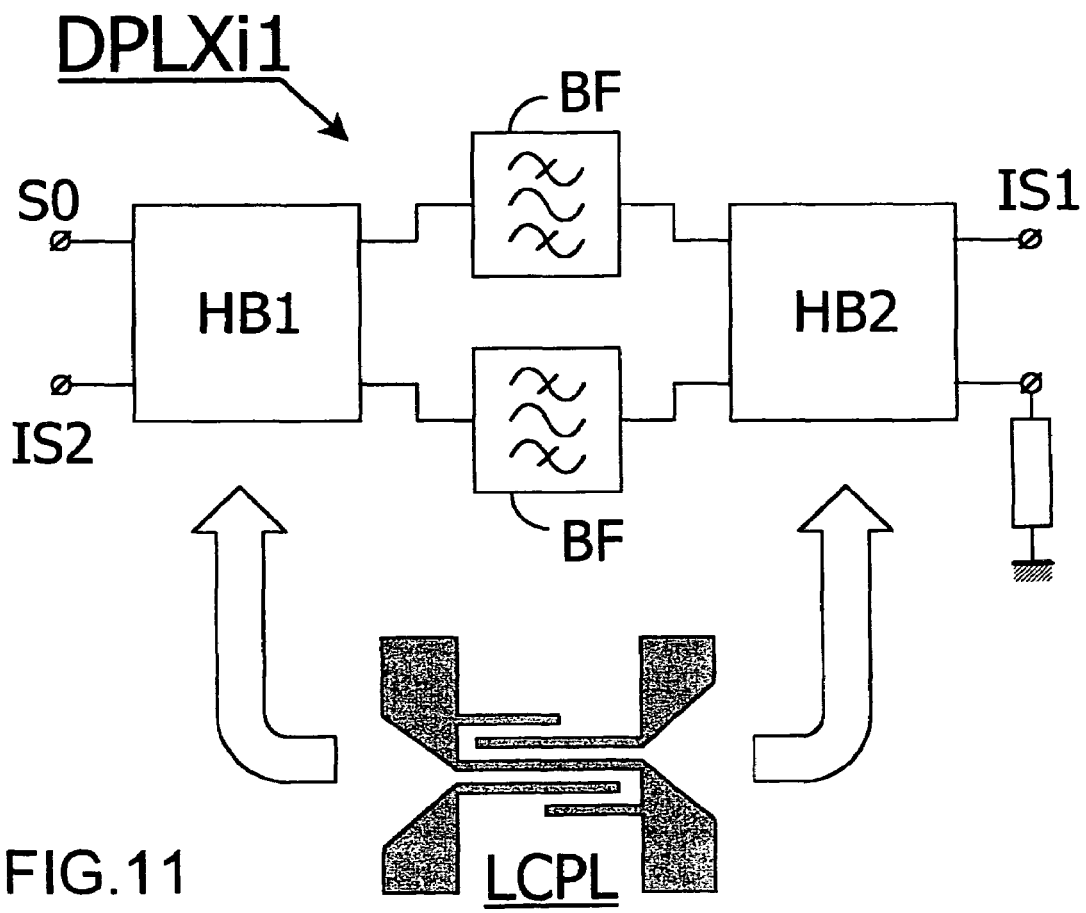
FIG. 11 is a block diagram depicting a diplexer included in such a frequency multiplexing module.

FIG. 11 shows a preferred embodiment of one of the above described diplexers, e.g. DPLXi1, which includes two 90°-hybrid quadripoles HB1 and HB2 connected together via two identical filters, in this example two band-pass filters BF, which is a simple and very cost-efficient structure enabling to extract two complementary frequency ranges from a single basic frequency range. Other types of identical filters could be used for a same purpose, like for example low-pass, high-pass or band-cut filters. Each 90°-hybrid quadripole is preferably formed by a Lange coupler LCPL, which is also quite cheap and easy to integrate.

The invention claimed is:

1. A telecommunication system comprising:
    at least one transmitter and one receiver, respectively configured to transmit and receive a signal formed by at least one pulse sequence modulated by symbol encoding units included in the transmitter;
    the symbol encoding units including,
    a plurality of signal encoders connected to a plurality of antennas, and each signal encoder comprising:
    a pulse generating unit configured to deliver a basic pulse sequence,
    a first energy splitting unit configured to split said basic pulse sequence into at least two split sub-sequences having respective different frequency sub-bands,
    a signal modulating unit configured to apply to the split sub-sequence obtained from the splitting of the basic pulse sequence a tunable coefficient representative of a symbol to be carried by said split sub-sequence, and
    a combination unit configured to combine the split sub-sequences delivered by the signal modulating units into a signal to be transmitted by one of the plurality of antennas to which one of the plurality of signal encoders is connected; wherein the antenna included in said transmitter is connected, via a switch unit, to a signal encoder and to a signal decoder, the combination unit included in said signal encoder and a second energy splitting unit included in a signal decoder constituted by a same reversible frequency multiplexing module.

2. The telecommunication system as claimed in claim 1, the pulse generating unit including
    a clock signal generator,
    a delaying gate configured to produce a delayed clock signal, and
    an output gate configured to combine the clock signal and the delayed clock signal to deliver a basic pulse sequence.

3. The telecommunication system as claimed in claim 2, the pulse generating unit further including a binary oscillator configured to deliver alternate binary values for alternately selecting a non-inverting output or an inverting output of said output gate.

4. The telecommunication system as claimed in claim 1, wherein the receiver comprises:
    symbol decoding units, the symbol decoding units including,
    a plurality of signal decoders connected to a plurality of antennas;
    a second energy splitting unit configured to split an incoming signal received by one of the plurality of antennas into at least two split sub-signals to be demodulated within respective receiver-side frequency sub-bands; and
    a signal demodulating unit configured to identify within the split sub-signal, a tunable coefficient applicable to the split sub-sequence before transmission of the incoming signal and representative of a symbol carried by said split sub-sequence.

5. The telecommunication system as claimed in claim 1, wherein said frequency multiplexing module includes a first diplexer connected to two other diplexers arranged in parallel.

6. The telecommunication system as claimed in claim 5, wherein at least one of said diplexers includes two 90°-hybrid quadripoles connected together via two identical filters.

7. The telecommunication system as claimed in claim 6 wherein the 90°-hybrid quadripole is a Lange coupler.

8. A device able to transmit a signal formed by at least one pulse sequence, comprising:
    symbol encoding units configured to multiply the pulse sequence by a value representative of a symbol to be carried by said pulse sequence, the symbol encoding units including,
    a plurality of signal encoders connected to a plurality of antennas, and each signal encoder comprising:
    a pulse generating unit configured to deliver a basic pulse sequence;
    a first energy splitting unit configured to split said basic pulse sequence into at least two split sub-sequences having respective different frequency sub-bands;
    a signal modulating unit configured to apply to the split sub-sequence obtained from the splitting of the basic pulse sequence a tunable coefficient representative of a symbol to be carried by said split sub-sequence; and
    a combination unit configured to combine the split sub-sequences delivered by the signal modulating unit into a signal to be transmitted by one of the plurality of antennas to which one of the plurality of encoders is connected; wherein the antenna included in said device is connected, via a switching unit, to a signal encoder and to a signal decoder, the combination unit included in said signal encoder and a second energy splitting unit included in a signal decoder constituted by a same reversible frequency multiplexing module.

9. A device, able to receive a signal formed by at least one pulse sequence, comprising:
    symbol decoding units including,
    a plurality of signal decoders connected to a plurality of antennas, and each signal decoder comprising:
    an energy splitting unit configured to split an incoming signal received by one of the plurality of antennas into at least two split sub-signals to be demodulated within respective receiver-side frequency sub-bands, the split sub-signal originating from a transmitted signal derived from a basic pulse sequence in a transmitter that had been split into sub-sequences having respective different frequency sub-bands, modulated, and then combined before being transmitted; and
    a signal demodulating unit configured to identify within the split sub-signal, a tunable coefficient applicable to the relevant pulse sequence before transmission of the incoming signal and representative of a symbol carried by said sub-sequence.

10. The telecommunication system as claimed in claim 1, wherein said basic pulse sequence comprises at least two pulses having at least one of a same shape and a same width.

* * * * *